United States Patent [19]

Darby et al.

[11] 4,071,790
[45] Jan. 31, 1978

[54] COOLING ARRANGEMENT FOR ROTOR END TURNS OF REVERSE FLOW COOLED DYNAMOELECTRIC MACHINES

[75] Inventors: William L. Darby, Scotia; Robert H. Monz; Stephen J. Molis, both of Schenectady, all of N.Y.

[73] Assignee: General Electric Company, Schenectady, N.Y.

[21] Appl. No.: 691,360

[22] Filed: June 1, 1976

[51] Int. Cl.² .................................................. H02K 9/00
[52] U.S. Cl. ......................................... 310/59; 310/62
[58] Field of Search .......................... 310/52, 53, 55, 57, 310/58, 59, 60, 61, 62, 63, 64, 65, 270, 112, 113, 114; 290/52

[56] References Cited

U.S. PATENT DOCUMENTS

| | | | |
|---|---|---|---|
| 3,110,827 | 11/1963 | Baudry | 310/55 |
| 3,265,912 | 8/1966 | Baudry | 310/55 |
| 3,271,600 | 9/1966 | Philofsky | 310/55 |
| 3,497,737 | 2/1970 | Philofsky | 310/59 |
| 3,739,208 | 6/1973 | Shartrand | 310/58 |

Primary Examiner—R. Skudy
Attorney, Agent, or Firm—John F. Ahern; Herbert E. Messenger; James W. Mitchell

[57] ABSTRACT

A reverse flow cooled dynamoelectric machine if provided with cooling gas passages extending through a fan ring and a portion of the rotor spindle to the end turns of the rotor winding in a direction substantially corresponding to the direction of flow of the cooling gas as modified by a tangential component imparted to the gas by the rotation of the fan ring. This direction is the vector sum of the longitudinal component of the velocity of the gas as it approaches the passages and the tangential component imparted by the rotation of the fan ring. The exit end of each passage is circumferentially displaced from the inlet end opposite to the direction of rotation. The centerlines of the gas passages lie in planes spaced around the axis of rotation of the rotor and parallel to this axis.

3 Claims, 4 Drawing Figures

COOLING ARRANGEMENT FOR ROTOR END TURNS OF REVERSE FLOW COOLED DYNAMOELECTRIC MACHINES

BACKGROUND OF THE INVENTION

1. Field of the Invention

This invention relates generally to reverse flow cooled dynamoelectric machines and more specifically to an arrangement for cooling the end turns of the rotor winding of such machines.

2. Description of the Prior Art

Large dynamoelectric machines such as turbine-generators are pressurized with a cooling gas such as hydrogen which is pumped throughout the machine by a fan fixed to the rotor. The cooling gas is pumped by the fan through cooling passages in a laminated stator core and into a gas gap defined by the interior of the stator core and the rotor surface. Cooling gas may be picked up by the rotor at its outer surface in a manner described in U.S. Pat. No. 3,348,081 to D. M. Willyoung and pumped through cooling passages defined by the field coils within the rotor, such structure being shown in U.S. Pat. No. 2,986,664 to D. M. Willyoung and P.A. Becker.

One particular cooling system employed in dynamoelectric machines is known as reverse flow cooling, an example of which is disclosed and claimed in U.S. Pat. No. 3,739,208 to Shartrand, assigned to the assignee of the present invention. In a reverse flow cooling system such as that shown in the aforementioned Shartrand patent, cooling gas is drawn from the end of the gas gap into the fan and is pumped by the fan to one or more gas coolers usually located in the upper portion of the machine. From the gas cooler, the flow of cooling gas is split, a portion of it being channeled to the interior of an end portion of the rotor, and the remainder being channeled into cooling passages disposed within the laminations of the stator core. The fan is normally mounted on a fan ring fixed to a spindle of the rotor.

The cooling gas channeled to the interior of the rotor is pumped thereinto through gas passages machined in the rotor spindle and extending from the fan ring to the end turns of the rotor winding. If the fan ring is shrunk on the spindle, the passages may be milled out of the rotor forging in an axial direction. However, on one end of the dynamoelectric machine rotor, there is provided a coupling to connect the rotor to a driving turbine. This coupling is of a diameter too large to allow a fan ring to pass over the coupling and be shrunk on the spindle. Therefore, at the turbine end of the rotor it is necessary to form the fan ring integral with the spindle. To provide the gas passages through which cooling gas is pumped to the end turns of the rotor winding, it is necessary to bore or drill through the fan ring. However, the turbine coupling interferes with the axial boring or drilling of the passages.

That portion of the gas channeled to the dynamoelectric machine rotor from the gas cooler impinges upon the fan ring in entering the cooling passages which provide for the conduction of the gas to the end turns of the rotor winding. Under the conditions of normal operation, the rotating fan ring imparts a tangential component of velocity to that cooling gas, that is, a component transverse to the direction of movement of the gas as it approaches the fan ring. Therefore, when longitudinal passages, that is, passages extending parallel to the axis of the rotor, are employed, substantial pressure losses occur in the gas flow since the direction of these passages differs from the direction in which the gas is being urged by the velocity imparted thereto.

By the present invention, the above problems associated with the prior art are avoided and an approach is provided in which the rotor gas passages through which the cooling gas is pumped to the end turns of the rotor winding extend in a direction which matches, to the most practicable extent, the direction of the cooling gas flow entering the passages. Further, the passages are provided in a direction which enable them to be formed by drilling or boring through the fan ring and a portion of the rotor spindle without interference from the turbine coupling.

Accordingly, it is an object of the present invention to provide a reverse flow cooled dynamoelectric machine with cooling gas passages extending from the fan ring to the end turns of the rotor winding in a direction which reduces or minimizes pressure losses in the flow of gas.

It is another object of the present invention to provide a dynamoelectric machine with rotor cooling gas passages which may be formed by boring or drilling through the fan ring without interference from the turbine coupling.

SUMMARY OF THE INVENTION

In accordance with this invention, in one form thereof, a dynamoelectric machine is provided with cooling gas passages extending from the outer face of a fan ring to the end turns of the rotor winding in a direction corresponding to the most practicable extent to the direction of the cooling gas entering the passages. This direction is the vector sum of the longitudinal and tangential components of the velocity of the gas stream as it enters the cooling passages. The exit end of each passage is circumferentially displaced from its inlet end opposite to the direction of rotation of the rotor. The centerlines of the gas passages lie in planes around the axis of the rotor, these planes being parallel to the axis of rotation.

DESCRIPTION OF A PREFERRED EMBODIMENT

Figure 1:
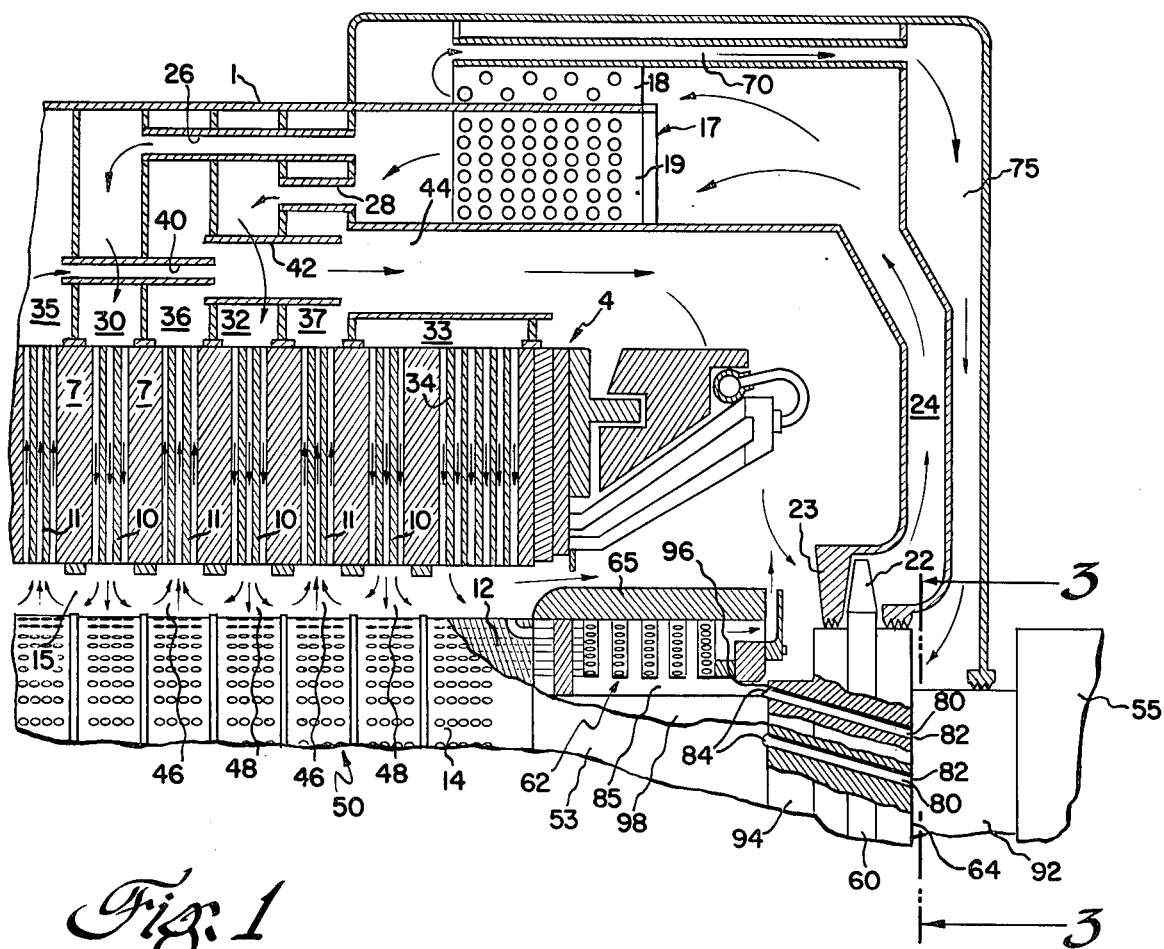
FIG. 1 is an elevation view in partial section of one end of a reverse flow cooled dynamoelectric machine employing the improved cooling arrangement of the present invention.

FIG. 1 illustrates the turbine end of a reverse flow cooled turbine-generator similar to that disclosed in U.S. Pat. No. 3,739,208 to Shartrand. The generator includes a gas-tight casing 1 pressurized with a cooling gas such as hydrogen. A stator 4 comprising a core formed from a plurality of stacked laminations assembled in packages 7 is disposed in casing 1. A plurality of axially spaced radially extending cooling passages 10 and 11 are defined by the laminations and accommodate a flow of gas therethrough for the cooling of the core. Passages 10 conduct cooling gas through the core in a radially inward direction. Passages 11 conduct the gas through the core in a radially outward direction. The turbine-generator also includes a rotating field 12 enclosed in a rotor 14 which is disposed within stator 4 and spaced therefrom by a gas gap 15. A gas cooler 17, divided into upper and lower sections 18 and 19, respectively, is also provided within casing 1. A fan 22 is attached to rotor 14 and draws cooling gas from gap 15 through a series of inlet guide vanes, one of which is shown at 23, pumping the cooling gas to cooler 17 through duct 24.

For the cooling of stator 4, ducts 26 and 28 communicating with lower section 19 of cooler 17 provide passages for the flow of cooling gas from the cooler to inlet chambers 30 and 32, respectively. From these chambers, gas is pumped to the gap and the rotor through cooling passages 10. A third inlet chamber 33 communicating directly with the lower section 19 of cooler 17 feeds gas to axially outer cooling passages 34.

Cooling gas is pumped outwardly through cooling passages 11 in stator 4 from gap 15 and exhausts from those cooling passages to outlet chambers 35, 36 and 37 and to tubes 40, 42 and 44 which direct this gas back to the fan. Therefore, it can be seen that gap 15 is divided into outlet flow areas 46 and inlet flow areas 48. The outlet flow areas are those areas through which cooling gas is pumped from the rotor to cooling passages 11. The inlet flow areas are those areas through which the gas is pumped from cooling passages 10 to the rotor.

Rotor 14 includes a body portion 50 cooled by gas picked up from gap 15 in a manner disclosed in U.S. Pat. No. 3,348,081 to D. M. Willyoung, assigned to the assignee of the present invention. Gas is pumped through cooling passages in the body portion 50 of rotor 1 through internal diagonal cooling passages machined within the field windings, a suitable construction being disclosed in U.S. Pat. No. 2,986,664 to D. M. Willyoung and P. A. Becker which is assigned to the assignee of the present invention.

In operation, cooling gas is pumped by fan 22 through conduit 24 and through cooler 17. That portion of the gas pumped through lower section 19 of cooler 17 is fed to inlet chambers 30 and 32 through ducts 26 and 28, respectively, around tubes 40 and 42. Cooling gas is provided at inlet chamber 33 directly from the outlet of cooler 17 by flowing around tube 44. From the inlet chambers 30, 32 and 33, the cooling gas passes through the stator cooling passages 10 communicating therewith, through gap 15 and is picked up by rotor 14. The rotation of the rotor provides a pumping action of cooling gas through the field coils as described in the aforementioned patents. After flowing through the field coils, the cooling gas exits the rotor to the gap where it is forced through cooling passages 11 in the stator core to outlet chambers 35, 36 and 37. The gas is conducted from these outlet chambers through tubes 40, 42 and 44 back to the inlet of fan 22.

Figure 2:
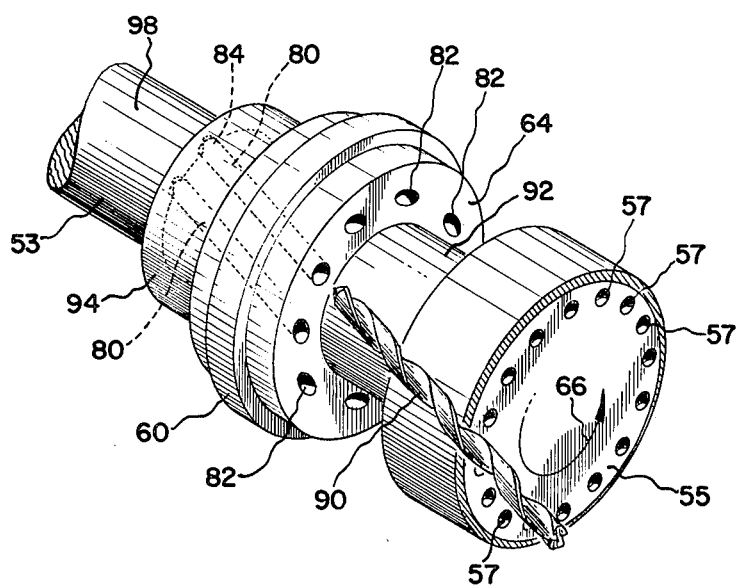
FIG. 2 is an isometric view of a portion of the dynamoelectric machine of the present invention and shows the position of a boring tool with respect to the rotor of the dynamoelectric machine, the cooling passages and the turbine coupling in carrying out the method of this invention.

Referring now to FIG. 2 as well as FIG. 1, it can be seen that rotor 14 includes a spindle 53 of reduced diameter having disposed thereon a turbine coupling 55 by which the rotor of the dynamoelectric machine is connected to the rotor of a suitable driving turbine (not shown). Coupling 55 is a cylindrical member of a diameter substantially greater than the diameter of spindle 53. This coupling is bored in a plurality of locations, as shown at 57 in FIG. 2, the bores receiving bolts which connect the turbine coupling to a similar coupling on the turbine rotor (not shown). To maintain the fan at a radial distance on the axis of rotation of the rotor to provide optimum circulation of the cooling gas, a fan ring 60 is provided on spindle 53, axially inward from the turbine coupling. On the collector end of the machine, the fan ring may be a separate member from the spindle shrunk on the spindle. However, on the turbine end of the dynamoelectric machine rotor, turbine coupling 55 interferes with the shrink-fitting of the fan ring onto the spindle. Therefore, on the turbine end of reverse flow cooled dynamoelectric machines, it is necessary to form the fan ring integral with the rotor spindle.

The field 12 includes end turns generally indicated at 62. A retaining ring 65, which holds the end turns in place against centrifugal force under operating conditions, overlies the end turns. For the cooling of these end turns, one or more tubes 70 are provided within casing 1 in communication with the upper section 18 of cooler 17 and with a gas passage 75 which leads to the region of spindle 53.

On the collector end of the rotor, where the fan ring may be shrunk onto the spindle, passages for cooling gas may be milled in the spindle in a longitudinal direction prior to shrink-fitting the fan ring onto the spindle, even though the longitudinal arrangement of the passages would result in high pressure losses in the gas flow for reasons earlier discussed. Such an arrangement is shown in the aforementioned Shartrand patent. However, on the turbine end of the rotor the turbine coupling 55 interferes with the use of boring or milling tools in this manner to cut such passages in the spindle. By the present invention, this problem of boring satisfactory passages for cooling gas despite potential interference by the turbine coupling is overcome. Moreover, it is overcome in such a manner that improved flow of cooling gas, with reduction in pressure losses in the gas flow, is also achieved.

Figure 3:
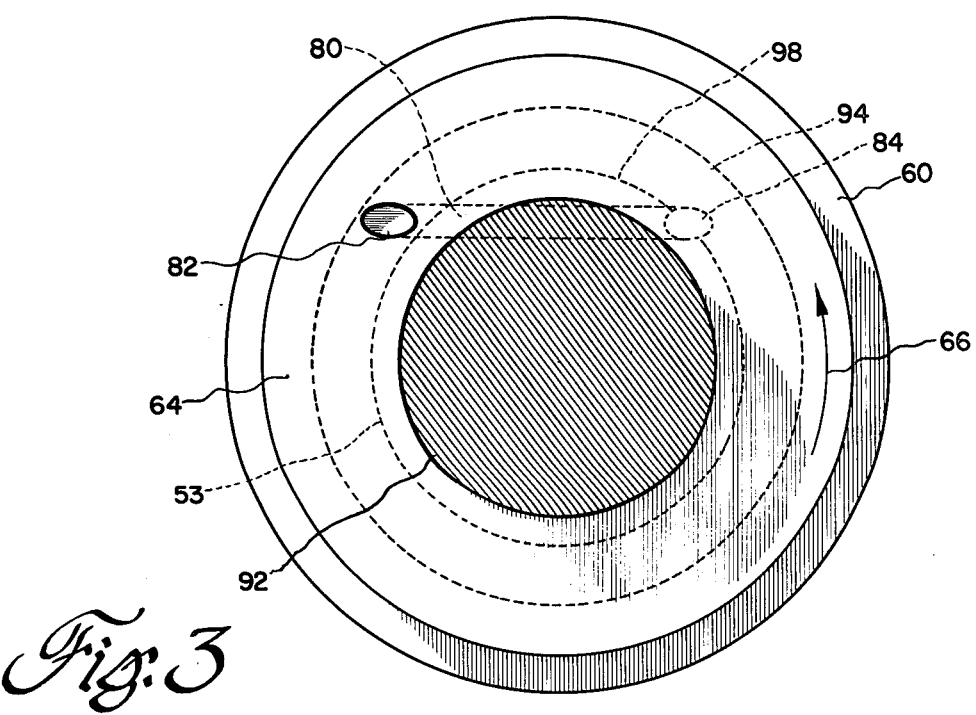
FIG. 3 is a view, partly in section, taken along line 3—3 of FIG. 1, with only one cooling passage shown for clarity.
Figure 4:
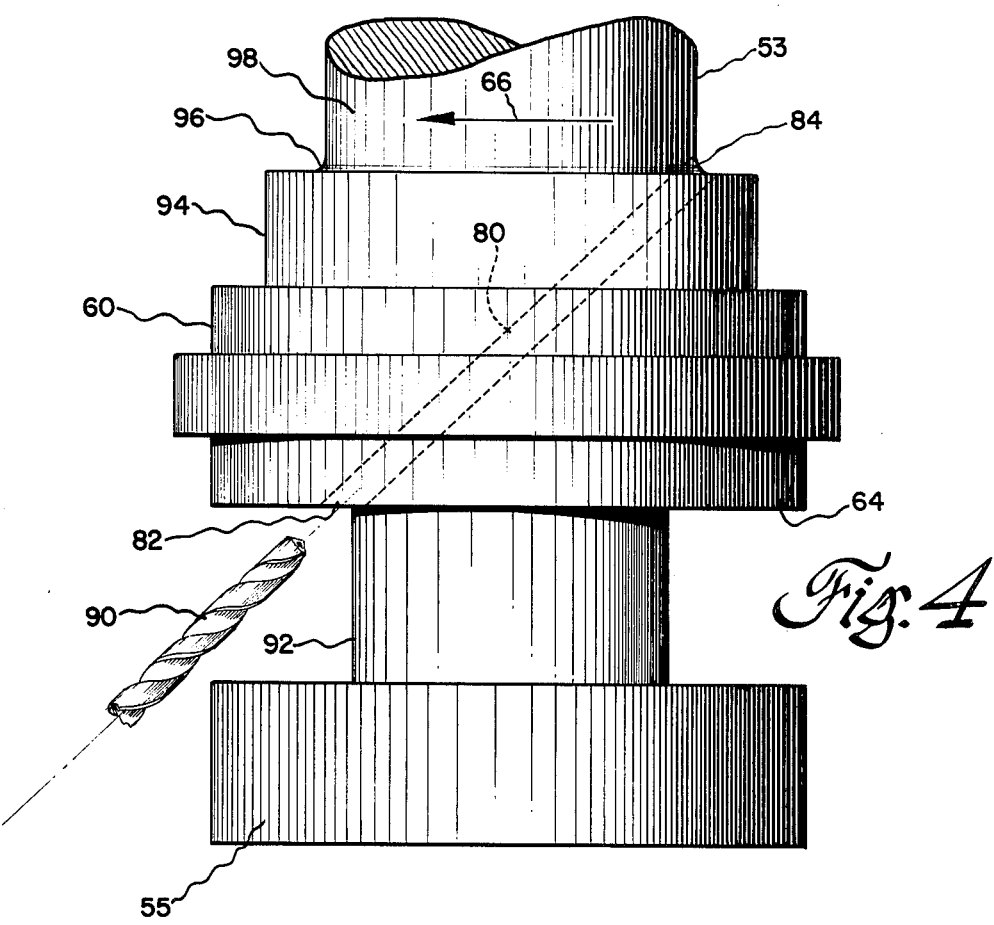
FIG. 4 is a top view of a portion of the rotor, including a fan ring and turbine coupling, to illustrate a different view of the cooling passage shown in FIG. 3.

The structure employed and the method by which this is accomplished can be better understood by referring also to FIGS. 2, 3 and 4. It can be seen that a plurality of passages 80 are provided at circumferentially spaced locations to provide for transmission of cooling gas from the passage 75 to the area 85 between the end turns 62 and the spindle 53. As shown in FIG. 2, the passages are inclined in such a manner that a boring tool 90 when positioned at an angle for proper boring of a passage 80 clears the outer circumference of the turbine coupling 55.

The arrangement of the individual passages 80 relative to the axis of the rotor and the direction of rotation of the rotor may be more clearly understood from FIGS. 3 and 4 where, for clarity, only a single passage 80 has been illustrated. It will be understood, of course, that a plurality of such passages, circumferentially spaced about the rotor are employed, as shown in FIG. 2.

In FIG. 3 it can be seen that each passage 80, while inclined laterally relative to the axis of the rotor is included in a plane generally parallel to the axis of the rotor; that is, the inlet 82 and the outlet 84 of the passage 80, are disposed at substantially the same radial distance from the axis of the rotor. The inclination of the passage 80 relative to the axis of the rotor, as is more clearly shown in FIG. 4, is chosen so that a boring tool for forming the passage 80 will clear the outer circumference of the turbine coupling 55. Moreover, the passage 80 can be chosen so as to be properly related to the axial and tangential components of the velocity of the gas passing through the passage 80 so as to reduce or minimize losses occurring therein. Finally, the passage is angled in the direction opposite to the rotation of the rotor, that is, the exit end 84 is displaced circumferentially from the inlet end 82 opposite to the direction of rotation of the rotor.

It will be understood that cooling gas transmitted through the passage 75 approaches the face 64 of the fan ring in a generally longitudinal or axial direction. With the rotor rotating in the direction indicated by the arrow 66 in FIGS. 3, 4 and 5, however, a tangential component of velocity is imparted to the gas so that the directional velocity of the gas is the vector sum of the longitudinal component of velocity of the gas as it approaches the fan ring and the tangential component imparted thereto by the rotation of the rotor and the fan ring.

It will be apparent that in some situations, for example, where the turbine coupling is positioned closer to the fan ring than in this embodiment, or the turbine coupling is of greater diameter, or the rotor speed is somewhat lower, it may not be possible to orient the boring tool at the optimum angle to minimize the gas losses to the fullest extent and still clear the turbine coupling. Likewise, if the required angle of holes to rotor axis is too great, the holes may become too closely spaced to be acceptable from a stress viewpoint, or the holes will be of small cross section leading to high velocities and high pressure losses offsetting the advantage of a slanted hole. In these cases, the angle may be less than optimum. This merely means that some compromise may have to be made, but in any event the inclining of the boring tool for the purpose of clearing the turbine coupling will always provide some additional advantage in securing a direction of the passages 80 which corresponds more closely to the direction of the vector sum of the longitudinal and tangential velocity components discussed earlier.

In the particular embodiment as shown, it will be seen that the diameter of the fan ring 60 and of the portions 92 and 94 of the spindle 53 are such that each passage extends through the fan ring 60 and a portion 94 of the spindle 53. The inlet end 82 of each passage is located in the face 64 of the fan ring near the circumference of the portion 92 of the spindle and the exit end 84 of the passage is disposed in the shoulder 96 of the spindle portion 94 and extends partially into the surface 98 of the spindle.

In carrying out the method of this invention, as best shown in FIG. 3, a plurality of indicia corresponding to desired positions of the inlet ends 82 of the passages 80 are appropriately indicated at circumferentially spaced positions around the face 64 of the fan ring. A boring tool 90 is positioned in alignment with one of these indicia and is positioned at an angle sufficient to clear the outer circumference of the turbine coupling 55. Further, the tool is positioned, within whatever limitations are imposed by the axial position and size of the turbine coupling, at an angle which reduces the losses in the gases flowing through the passages made by the boring tool 90. The boring tool 90 is positioned at an angle such that the exit end of the resulting passage 80 is displaced circumferentially from the inlet end in a direction opposite to the direction of rotation of the rotor. With the boring tool held in this position, the first passage 80 is formed by boring through the fan ring and the aforementioned portion of the spindle to the exit end 84 of that passage. The boring tool is then shifted to the next indicia marked on the fan ring and a second passage formed at a corresponding angle. This process is continued until the desired number of equally spaced gas passages are formed circumferentially about the rotor.

In the arrangement of this invention the angle of passages 80 is chosen so as to correspond to the most practicable extent with the angle of direction of the flow of gas entering these passages. Resistance to flow of gas through the passages 80 is thereby reduced and fluid pressure losses through these passages are correspondingly reduced. This represents a significant improvement over cooling passages employed in prior art dynamoelectric machine rotors in which the passages from the fan ring to the end windings extend in an axial or longitudinal direction. In such a prior art arrangement, since the direction of the passages differs substantially from the direction of the cooling gas flow as it enters the passages, substantial fluid losses are introduced into the gas flow, thereby substantially reducing the ability of this gas to cool the end turns.

It can be seen then that the dynamoelectric machine rotor structure of the present invention provides an ease and economy of manufacture due to the elimination of any interference from a turbine coupling with the machining of cooling passages in the fan ring and the rotor spindle. Furthermore, the cooling passages are inclined at an angle which tends to correspond to the direction of gas flow at the inlet ends of the passages, thereby causing cooling gas to be pumped into the end turn region of the field with a reduction of fluid losses. Such a reduction of fluid losses provides more effective cooling of the field end turns and therefore increases the electrical capabilities of the machine.

While inclined cooling passages have been employed in prior art forward-flow gas-cooled generators, these passages were disposed in a centering ring of approximately three inches in thickness disposed between the retaining ring and the spindle. These prior art inclined passages, unlike cooling passages 80 of the present invention, did not contribute to the ease and economy of manufacture of the dynamoelectric machine rotor. Furthermore, these prior art inclined passages were employed at the fan suction location of a gas-cooled dynamoelectric machine rather than at the fan pressure side, leading to an attempt to cool the rotor ends in spite of adverse pressure distributions. This differs from the present invention, which adds a significant amount of ventilating pressure to the normal centrifugal pumping pressure.

While there has been shown and described a specific embodiment of the reverse flow cooled dynamoelectric machine of the present invention, it will be apparent to those skilled in the art that modifications may be made without departing from the substance of this invention and it is intended by the appended claims to cover such modifications as come within the spirit and scope of this invention.

What is claimed is:

1. A reverse flow cooled dynamoelectric machine comprising:
   a. a stator;
   b. a rotor disposed within the interior of said stator and defining with said stator a gas gap;

c. said rotor including a spindle and a winding including end turns disposed radially outward from said spindle;

d. a cylindrical turbine coupling formed integrally with said rotor spindle on the turbine end of said spindle for connecting said rotor to a driving turbine;

e. a fan ring formed integrally with said spindle, said fan ring located axially inward from and proximate to said turbine coupling and having an inner diameter less than the outer diameter of said coupling;

f. a fan mounted on said ring for circulating cooling gas through said rotor and said stator; and g. a plurality of passages extending through said fan ring and a portion of said spindle for the conduction of cooling gas to said end turns, said passages extending in a direction at an angle to the axis of said rotor and corresponding to the most practicable extent to the vector sum of the axial and tangential components of the velocity of the cooling gas entering said passages to minimize pressure losses in the flow of cooling gas through said passages.

2. The reverse flow cooled dynamoelectric machine as described in claim 1 wherein said passages are disposed in planes spaced around the axis of rotation of said rotor and parallel to said axis.

3. The dynamoelectric machine of claim 2 wherein each of said passages is disposed at an acute angle to said axis, with the exit end of each passage being circumferentially displaced from its inlet end in a direction opposite to the direction of rotation of said rotor.

* * * * *